(12) United States Patent
Cheng et al.

(10) Patent No.: US 10,129,266 B2
(45) Date of Patent: Nov. 13, 2018

(54) IDENTITY INFORMATION SYSTEMS AND METHODS

(71) Applicant: Barclays Bank PLC, London (GB)

(72) Inventors: Lawrence Lok-Lun Cheng, London (GB); Jeremy Goldstone, Manchester (GB)

( * ) Notice: Subject to any disclaimer, the term of this patent is extended or adjusted under 35 U.S.C. 154(b) by 0 days.

(21) Appl. No.: 14/646,719

(22) PCT Filed: Nov. 22, 2013

(86) PCT No.: PCT/GB2013/053081
§ 371 (c)(1),
(2) Date: May 21, 2015

(87) PCT Pub. No.: WO2014/080210
PCT Pub. Date: May 30, 2014

(65) Prior Publication Data
US 2015/0304342 A1 Oct. 22, 2015

(30) Foreign Application Priority Data
Nov. 22, 2012 (GB) .................................. 1221005.0

(51) Int. Cl.
*H04L 29/06* (2006.01)
*G06F 21/62* (2013.01)
(52) U.S. Cl.
CPC .......... *H04L 63/12* (2013.01); *G06F 21/6245* (2013.01); *H04L 63/08* (2013.01)
(58) Field of Classification Search
CPC combination set(s) only.
See application file for complete search history.

(56) References Cited

U.S. PATENT DOCUMENTS

| | | | |
|---|---|---|---|
| 2001/0003178 A1* | 6/2001 | Chen | G06Q 10/087 705/28 |
| 2002/0019817 A1* | 2/2002 | Matsui | G06F 21/10 |
| 2002/0054174 A1* | 5/2002 | Abbott | G06F 1/163 715/863 |
| 2002/0078204 A1* | 6/2002 | Newell | G06F 1/163 709/225 |

(Continued)

FOREIGN PATENT DOCUMENTS

| | | |
|---|---|---|
| WO | 01/50299 A2 | 7/2001 |
| WO | 01/11921 A2 | 8/2001 |
| WO | 2011/153355 A2 | 12/2011 |

OTHER PUBLICATIONS

International Search Report of PCT/GB2013/053081 dated Mar. 6, 2014.

(Continued)

*Primary Examiner* — Phy Anh Vu
(74) *Attorney, Agent, or Firm* — Foley & Lardner LLP

(57) ABSTRACT

A computer implemented method of providing candidate information comprises: obtaining a challenge code from a verification service at a first device associated with an ID candidate; capturing the challenge code from the first device at a second device associated with an ID checker; verifying the challenge code between the second device and the verification service and, if the challenge code is verified, providing the candidate information from the verification service, such that the candidate information is accessible to the ID checker.

16 Claims, 16 Drawing Sheets

(56) References Cited

U.S. PATENT DOCUMENTS

| | | | |
|---|---|---|---|
| 2002/0083014 A1* | 6/2002 | Brickell | G06Q 10/10 705/76 |
| 2002/0120864 A1* | 8/2002 | Wu | G06F 21/6245 726/6 |
| 2004/0024763 A1* | 2/2004 | Anderson | G06Q 10/10 |
| 2006/0224611 A1* | 10/2006 | Dunn | G06F 21/6245 |
| 2008/0115191 A1* | 5/2008 | Kim | G06F 21/6245 726/1 |
| 2008/0201431 A1* | 8/2008 | Ahn | H04L 51/00 709/206 |
| 2008/0301444 A1* | 12/2008 | Kim | H04L 63/08 713/169 |
| 2009/0106150 A1* | 4/2009 | Pelegero | G06Q 20/10 705/44 |
| 2010/0169980 A1* | 7/2010 | Kim | G06F 21/6245 726/27 |
| 2010/0306819 A1 | 12/2010 | Nahari et al. | |
| 2011/0030067 A1* | 2/2011 | Wilson | G06F 21/6245 726/27 |
| 2011/0238482 A1 | 9/2011 | Carney et al. | |
| 2012/0311326 A1* | 12/2012 | Kim | H04L 63/126 713/162 |
| 2013/0247142 A1* | 9/2013 | Nishizawa | G06F 21/604 726/1 |
| 2013/0291123 A1* | 10/2013 | Rajkumar | G06F 21/00 726/28 |
| 2014/0090091 A1* | 3/2014 | Prakash | G06F 21/6245 726/30 |

OTHER PUBLICATIONS

Examination Report dated Sep. 14, 2016 for corresponding EP Application No. 13 821 704.7.

International Preliminary Report on Patentability in International Application No. PCT/GB2013/053081 dated May 6, 2015 (7 pages).

International Search Report and Written Opinion in International Application No. PCT/GB2013/053081 dated Mar. 6, 2014 (9 pages).

\* cited by examiner

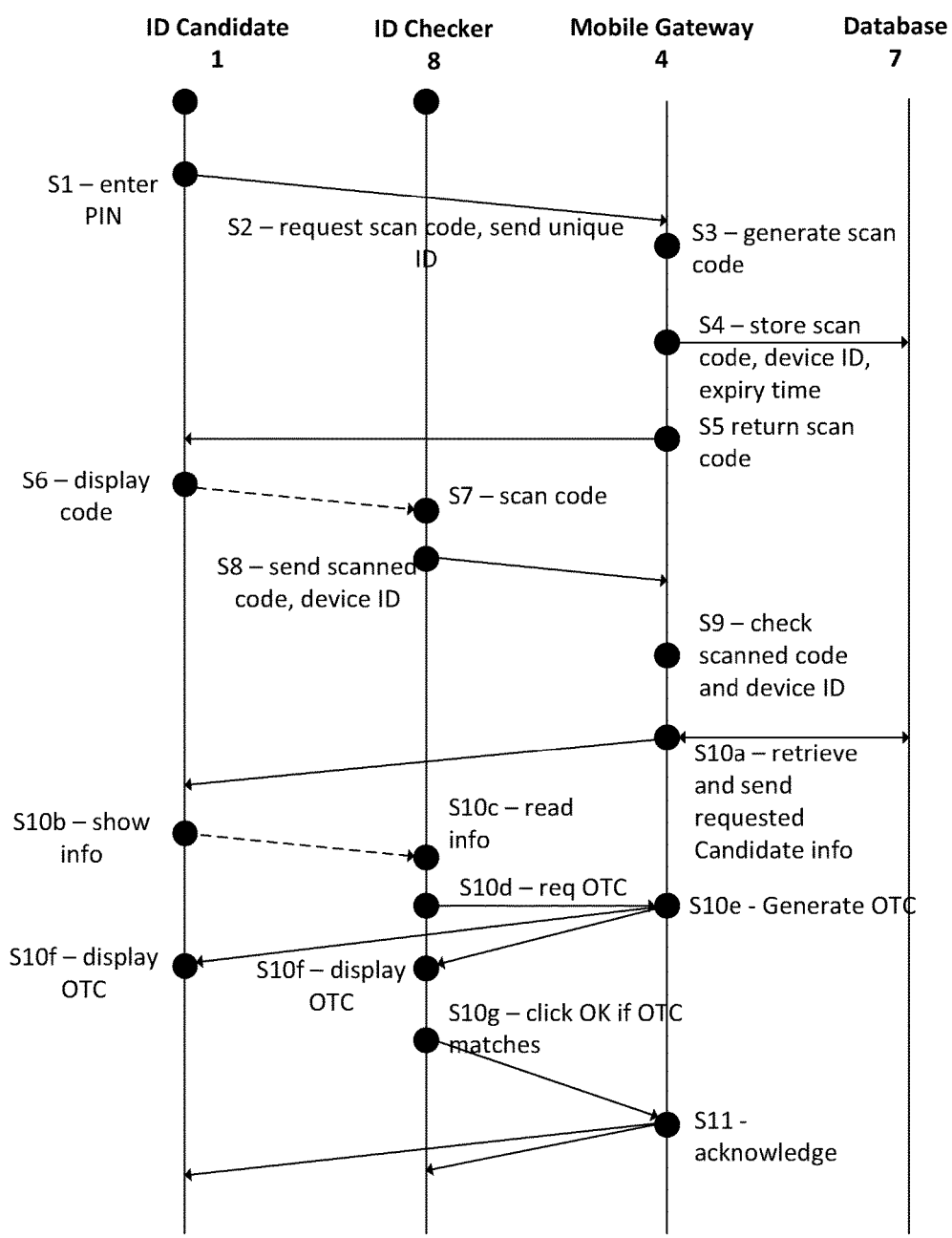

FIG. 3gii
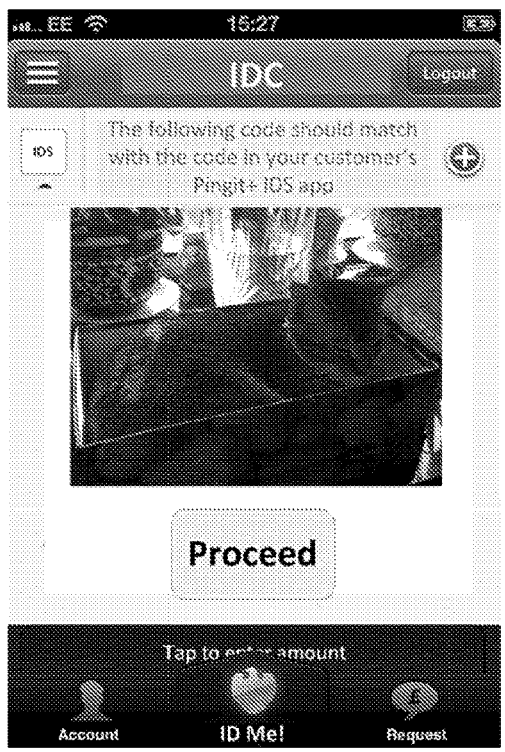
FIG. 3giii
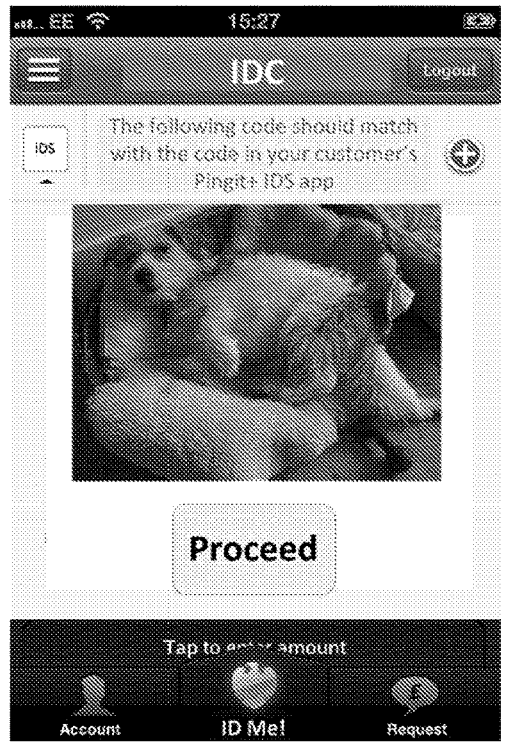

FIG. 4a
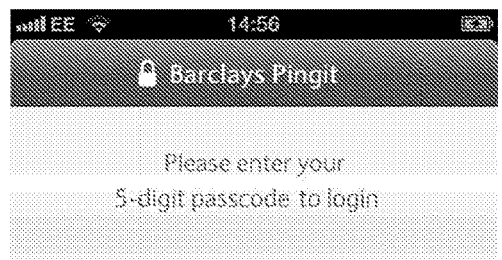
FIG. 4b
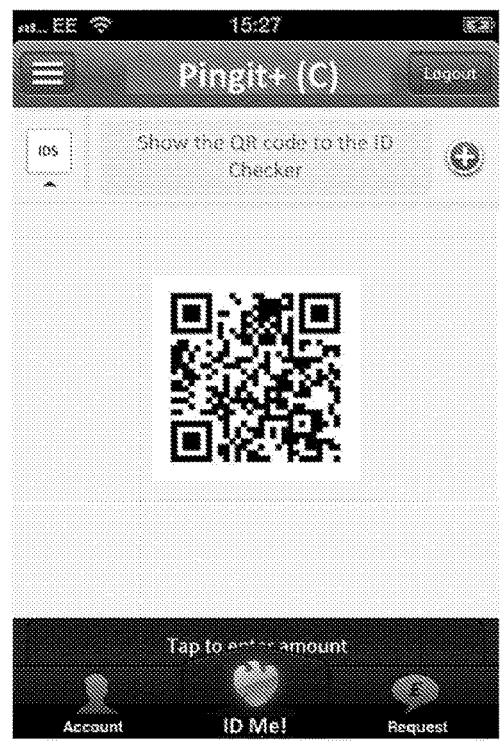

FIG. 4di
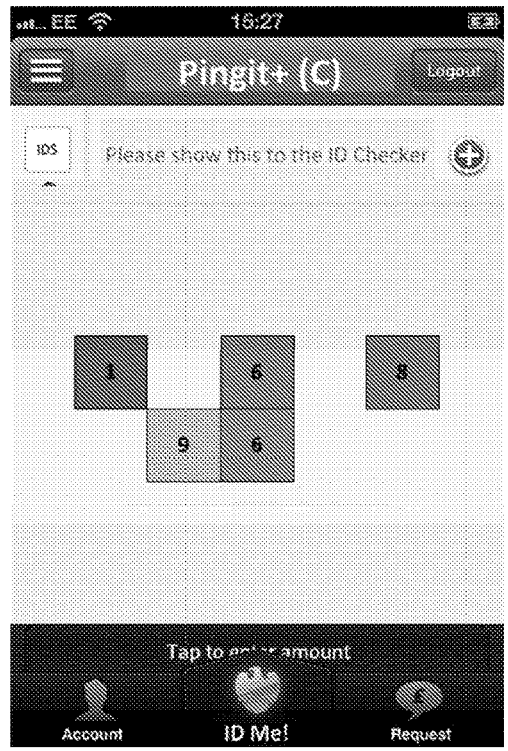
FIG. 4dii
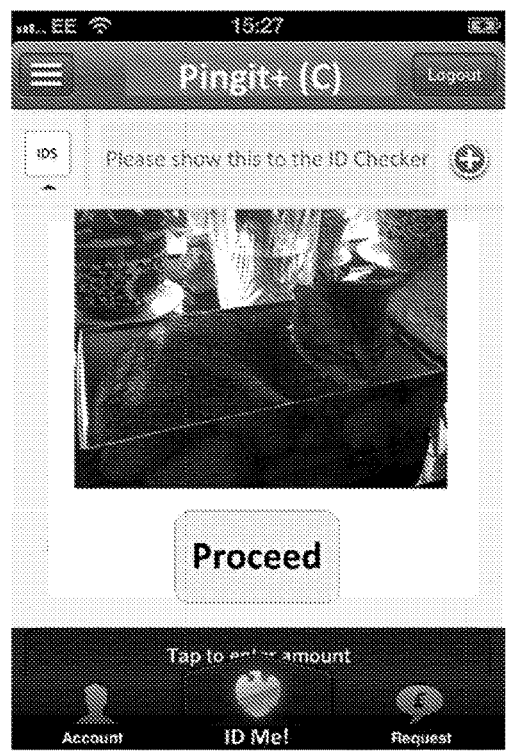

FIG. 4diii 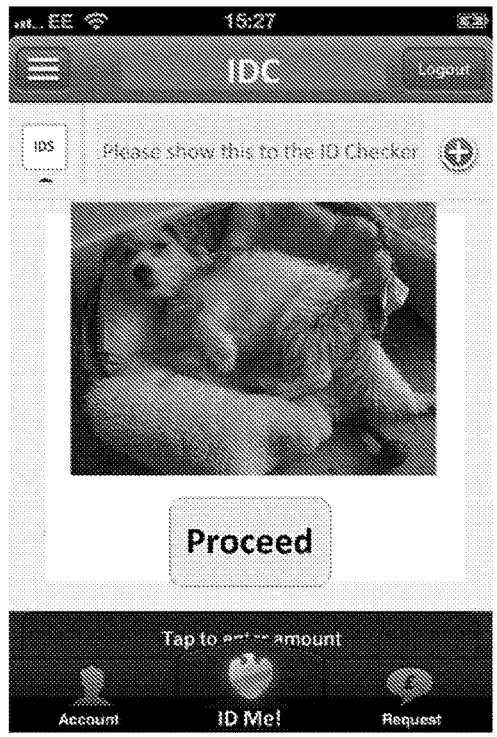

IDENTITY INFORMATION SYSTEMS AND METHODS

CROSS-REFERENCE TO RELATED APPLICATIONS

This application claims priority to International Application No. PCT/GB2013/053081 filed on Nov. 22, 2013 and Great Britain Application No. 1221005.0 filed Nov. 22, 2012, the entire disclosures of which are hereby incorporated by reference.

FIELD OF THE INVENTION

This invention relates to methods and systems for providing to information relating to an identity (ID) candidate.

BACKGROUND OF THE INVENTION

The identity of an ID candidate may conventionally be verified using a token, such as a card or badge, that is presented to an ID checker for verification. The token may carry a code, such as a barcode, that carries information about the ID candidate. The token may carry biometric data, such as a photograph of the ID candidate, so as to bind the token to the ID candidate. However, such conventional systems are prone to fraud, since the token may be stolen or counterfeited. They are also inflexible, in that the information they provide is static. Often, they are only designed for a single purpose.

Patent publication WO-A-2011/153355 (McKenzie) discloses a method of verifying permission to use a payment system, where the customer presents a communication device to a merchant, who extracts account information from the device, and sends a request for identification verification information to be sent to the device, or to an alternate display. The merchant can then compare the identification verification information to the customer to determine if the customer is authorised to use the account.

Patent publication US-A-2009/0106150 (eBay) discloses a system where an individual may prepare a token authorising a requesting party to obtain access to specified information associated with the individual.

SUMMARY OF THE INVENTION

According to one aspect of the present invention, there is provided a computer implemented method of providing candidate information, the method comprising: obtaining a challenge code from a verification service at a first device associated with an ID candidate; capturing the challenge code from the first device at a second device associated with an ID checker; verifying the challenge code between the second device and the verification service and, if the challenge code is verified, providing the candidate information from the verification service, such that the candidate information is accessible to the ID checker. Preferably, the information is provided securely from the verification service, which is trusted to provide reliable information.

Preferably, the challenge code does not contain candidate information pertaining to the ID candidate, so that candidate information cannot be obtained by the ID checker without reference to the verification service. This allows the verification service to determine the extent of information that can be provided, to authenticate ID checkers and to distinguish between ID checkers based on various criteria including degree of trustworthiness of the ID checker, value to verification service, etc.

In one embodiment, the candidate information is provided to the first device. In another embodiment, the candidate information is provided to the second device only after approval is provided from the first device. The first device may be informed of what candidate information is requested, and the identity and/or status of the ID checker, before giving approval. Either embodiment allows the ID candidate to control what information is released to the ID checker.

In some embodiments, the ID checker may specify, on the second device, what information is required. The specified information may be a binary or 'yes/no' check against a criterion specified by the ID checker. This provides a flexible ID verification service in which only the information that is needed may be requested and provided.

In some embodiments, a validation code may be provided to both the first and second devices, and may be displayed on both devices so that the identification process may be validated as genuine by the ID candidate or the ID checker. The validation code may include a graphical image, for ease of comparison between the two devices and/or to make the service more attractive.

There may be provided a mobile device, a mobile gateway, a system and associated computer programs arranged to carry out the above method. In particular, software applications on the mobile gateway, or the first or second device, which enable one or more of the above methods, are believed to be novel and inventive.

BRIEF DESCRIPTION OF THE DRAWINGS

There now follows, by way of example only, a detailed description of embodiments of the present invention, with reference to the figures identified below.

FIG. 2 is a diagram of an ID verification method in a first embodiment of the invention.

FIGS. 4a to 4e are screenshots from a mobile device of an ID candidate in the first embodiment.

DETAILED DESCRIPTION OF EMBODIMENTS OF THE INVENTION

Technical Architecture

Figure 1:
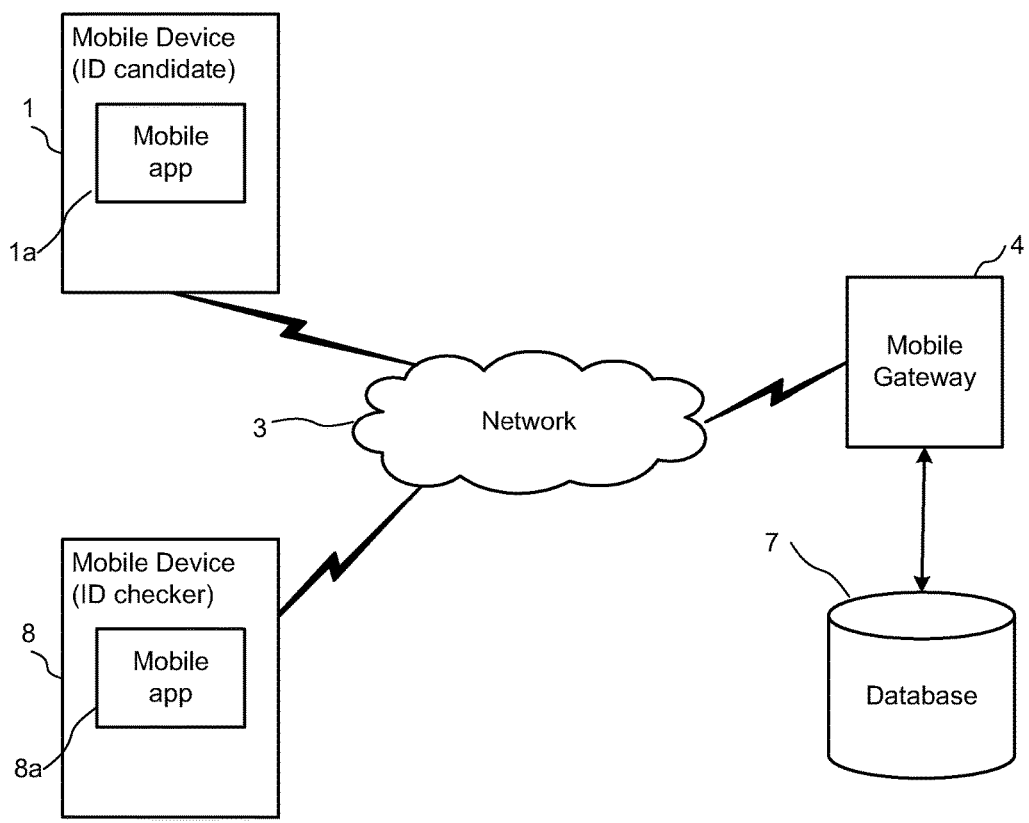
FIG. 1 is a block diagram showing the main components of an ID verification system according to embodiments of the invention.

Referring to FIG. 1, an ID verification system according to embodiments of the invention comprises a first wireless or mobile device 1 having an ID candidate application 1a, and a second wireless or mobile device 8 having an ID checker application 8a. The mobile devices 1, 8 communicate over a network 3, such as a wireless or mobile network and/or Internet with a mobile gateway 4, preferably using a secure protocol such as Secure Sockets Layer (SSL). The mobile gateway 4 provides a verification service to an ID checker relating to an ID candidate, as described in more detail below.

The mobile devices 1, 8 are of a type that is known per se, such as an iOS™, Blackberry™ or Android™ based smartphone, a 'feature' phone, a personal digital assistant (PDA), a tablet computer, or any processor-powered device with suitable input and display means. In some embodiments, the mobile devices 1, 8 need not have a voice telephony function. In some embodiments, the device 8 need not be mobile, but may be a desktop computer or a point-of-sale (POS) terminal, for example. It is preferred that the mobile device 1 of the ID candidate is mobile, but in some embodiments this may not be essential.

In a client-server version of the system, the devices 1, 8 may comprise clients and the mobile gateway 4 may comprise a server. Alternatively, the devices 1, 8 may comprise terminals in the network 3.

The network 3 may comprise a terrestrial cellular network such as a 2G, 3G or 4G network, a private or public wireless network such as a WiFi™-based network and/or a mobile satellite network or the Internet. It will be appreciated that a plurality of, and preferably a large number of mobile devices 1, 8 are operable concurrently within the system.

The mobile gateway 4 also has access to a database 7 including ID and registration data of ID candidates and, optionally, ID checkers. The candidate data may include personal data (such as name, date of birth), biometric data (such as photograph, fingerprint, iris scan), contact data (for example address, email address, telephone number), and social data (for example club membership number, Facebook profile data, previous transaction records). The candidate data for each ID candidate may be captured and verified during an ID candidate registration process, for example using official records, statements, or documents. Additionally, some data may be provided by the ID candidate without verification by the verification service and may be flagged as unverified, when stored on the database 7 and preferably when subsequently provided to an ID checker.

ID Candidate Registration

The ID candidate application 1a is preferably registered with the mobile gateway 4 during setup of the ID candidate application 1a on the mobile device 1, and is associated with the ID and registration data of an ID candidate. Registration may involve setting up one or more cryptographic keys for secure communication between the ID candidate application 1a and the mobile gateway 4. The key(s) may be generated from a passcode entered by the user during setup. The passcode may be a PIN, graphical passcode and/or biometric data such as a fingerprint or iris scan. The passcode may be modified by the user after setup.

In the specific embodiments described below, a user (i.e. the ID candidate or the ID checker) is required to enter the passcode as part of an authentication process. The passcode may be entered as a numeric or alphanumeric input, a graphical input such as a signature or gesture, or a biometric input. Preferably, the passcode is validated remotely, for example by generating a cryptographic key from the passcode, which key is used to sign a message sent to the mobile gateway 4 and/or a challenge sent by the mobile gateway 4. The mobile gateway 4 only responds as described in the embodiments below if the resulting signature is validated. If not, the mobile gateway 4 may prompt the application 1a, 8a to request the passcode again. The mobile gateway 4 may block access by the application 1a, 8a if it presents an invalid signature more than a predetermined number of times. In this way, the authentication process is made resistant to 'brute force' attacks.

Alternatively the passcode may be validated locally against a passcode stored in a local secure area of the mobile device 1, 8. If the passcode is validated, then the user application 1a, 8a is enabled to operate, for example as described in the specific embodiments below. This enablement may include access to locally stored cryptographic key(s) for secure communication with the mobile gateway 4.

Introduction

The following embodiments involve an ID verification process in which an ID candidate is required to authorise provision of candidate information to an ID checker, by displaying a challenge code which is scanned by the ID checker and used to access the required candidate information via the mobile gateway 4.

The ID candidate may for example be requesting membership or entry to a club with a minimum age requirement. Therefore, the ID candidate is not necessarily required to provide full candidate information, but only the candidate information required by the ID checker. The information may be a simple 'yes/no' answer to an ID-related question posed by the ID checker, such as 'is the candidate over 18?', or may be specific information without reference to a question, such as the candidate's date of birth.

First Embodiment

FIGS. 2 and 3a to 3h illustrate a verification system and method in a first embodiment of the present invention. In this embodiment, the identity of the ID checker is not validated, so security measures are included which protect against the misuse of candidate data by the ID checker.

Before the ID verification process proceeds, the ID candidate downloads and registers the ID candidate application 1a to the first device 1a, and the ID checker downloads and registers the ID checker application 8a to the second device 8. The ID candidate application 1a and the ID checker application 8a may be discrete applications, or may be integrated within a mobile application having additional functionality, such as a mobile wallet or mobile merchant application respectively. However, the present invention is not limited to verification in the context of mobile payments. Instead of using the applications 1a, 8a, embodiments of the invention may be implemented in a generic application, such as a browser.

Challenge Code Verification

At step S1, the ID candidate is authenticated to the ID candidate application, for example by entering a PIN as illustrated in FIG. 4a. The PIN may be verified as described above.

At step S2 the ID candidate application 1a sends a secure request for a challenge code, including a unique ID, to the mobile gateway 4. The unique ID preferably represents the specific instance of the ID candidate application, for example as set up during registration. Alternatively, the unique ID may be a code identifying the mobile device, such as an IMEI number.

The mobile gateway 4 generates a challenge code at step S3, for example using a hardware security module (HSM). The challenge code may be a reference code randomly or pseudo-randomly generated for each session, and preferably carries no information about the ID candidate. At step S4, the mobile gateway 4 stores the challenge code in a record in the database 7; the record or the challenge code itself may also include the device ID and validity information, such as an expiry time and/or a location of the ID candidate application 1a when sending the secure request.

At step S5, the mobile gateway 4 sends the challenge code over a secure connection to the ID candidate application 1a. At step S6, the ID candidate application 1a displays the challenge code in machine-readable form, as shown for example in FIG. 4b. The machine-readable form may be a bar code or two-dimensional code, and is preferably a quick-response (QR) code, for example as defined in standard ISO/IEC 18004:2006. Other forms of machine-readable code may be used, such as machine-readable text, images and/or audio code.

The challenge code may be converted to the machine readable form by the mobile gateway 4 before sending to the ID candidate application 1a, or may be converted to machine readable form by the ID candidate application 1a. Alternatively or additionally, the challenge code may be displayed or otherwise output in human-readable form, so that the ID checker can manually enter the challenge code.

Before scanning the challenge code and sending the challenge code to the mobile gateway 4 for verification, the ID checker specifies what candidate data is to be verified; this may be specified for each session, but is preferably specified during registration and/or configuration of the ID checker application 8a, since the ID checker is likely to require the same specification for multiple candidates. The specification may be cached in the mobile gateway 4 to ease future re-use.

Figure 3A:
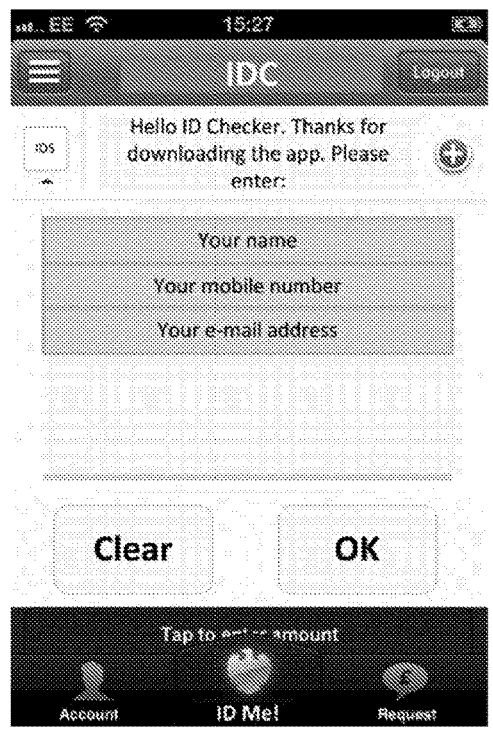
FIGS. 3a to 3h are screenshots from a mobile device of an ID checker in the first embodiment.
Figure 3B:
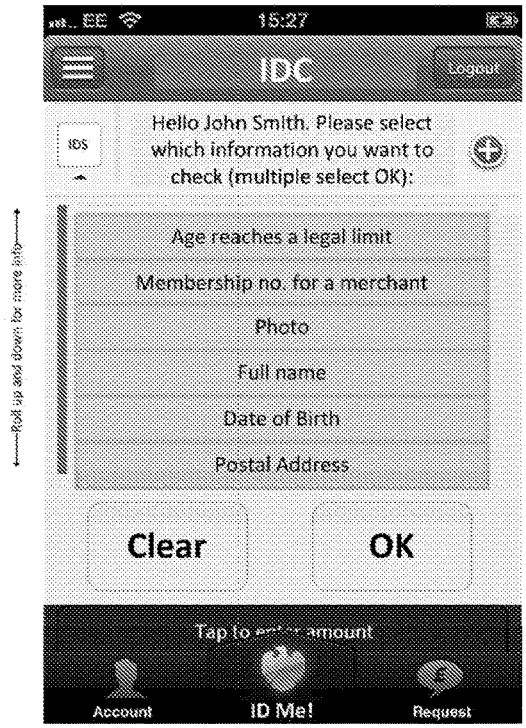
Figure 3C:
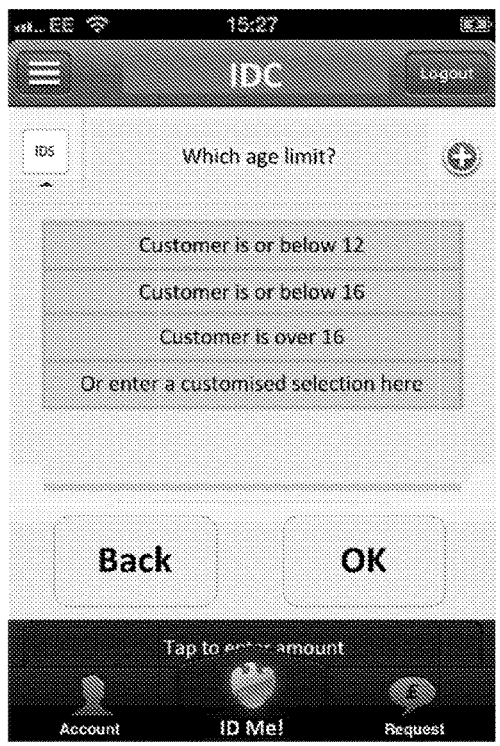
Figure 3D:
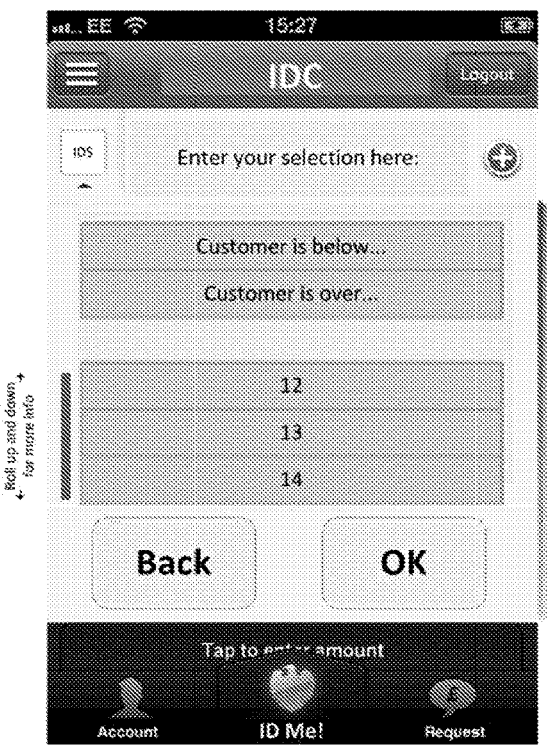

A sample specification process is illustrated in FIGS. 3b to 3d. As illustrated in FIG. 3b, the ID checker application 8a presents to the ID checker a menu to select what type of information is required for the ID candidate, such as:
  whether an age requirement is met
  a membership number, such as a merchant membership number
  photo
  full name
  date of birth
  postal address The ID checker makes a selection from the menu. For some menu options, such as the age requirement, a sub-menu is required to specify the requirement. For example, as shown in FIG. 3c, the ID checker may select from a menu of age requirements, such as:
  below 12
  below 16
  over 16
  customised selection In the case of the customised selection, the ID checker may select from a further menu, with the following options:
  is below . . .
  is over . . .
and the specific age may be selected from a list of relevant ages.

The ID checker application 8a may allow the ID checker to specify combinations of information and/or criteria, such as 'Is the candidate over 18 and a UK citizen?' or 'Is the candidate under 18 and if so, what is their age?', for example by selecting multiple options from a menu or by using a natural language query.

Figure 3E:
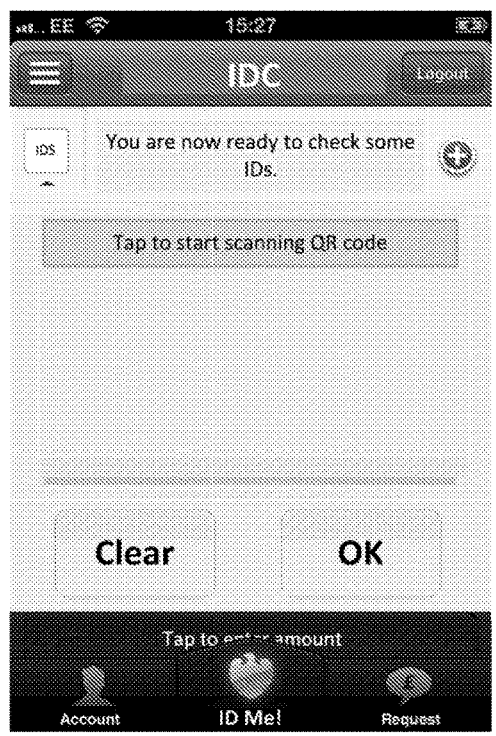

To begin an ID checking session, the ID checker application 8a prompts the ID checker to start scanning a challenge code, as shown in FIG. 3e. At step S7, the ID checker captures the challenge code into the ID checker application 8a, using for example a camera or scanner 16 integrated with the mobile device 8. Alternatively, the challenge code may be read by the ID checker and manually entered into the ID checker application. Other means of capture may be used, depending on the form of the challenge code.

At step S8, the ID checker application 8a sends the scanned code and the unique ID to the mobile gateway 4.

Validation, Provision of Information and Acknowledgement

At step S9, the mobile gateway 4 validates the scanned code, for example by checking against the challenge code previously stored in the database 7, or by verifying a digital signature within the scanned code. Validation may further include checking the validity of the scanned code, for example by checking whether the current time is before a specified expiry time, and/or by checking whether the scanned code is sent from a location in proximity to a specified location for the challenge code.

If the scanned code is verified, the mobile gateway 4 obtains the requested candidate information for the corresponding ID candidate and sends the requested information to the ID candidate application 1a, at step S10a.

Figure 4C:
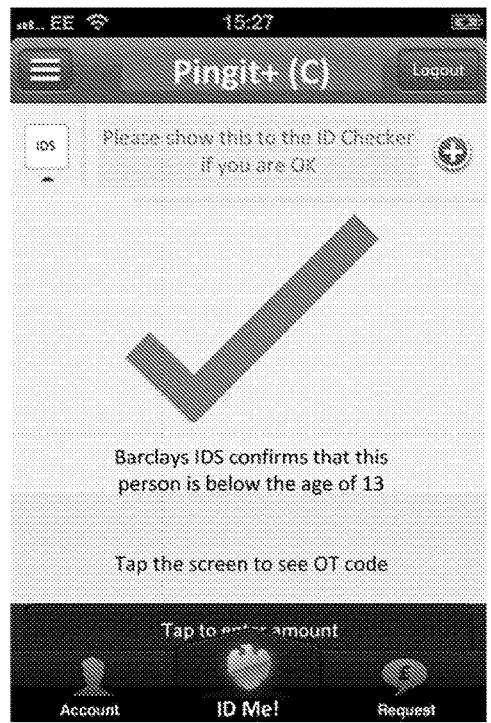

At step S10b, the ID candidate application 1a displays the requested information, as shown for example in FIG. 4c. The ID candidate can then decide whether or not to show the requested information to the ID checker, thus ensuring that the ID candidate retains control over the use of their information. If the ID candidate allows it, the ID checker reads the information from the ID candidate's device 1 at step 10c, and may then take whatever action is necessary based on that information.

Optionally, a digital photograph and/or biometric information of the ID candidate may be sent with the requested information and may be displayed with the requested information on the candidate device 1, so that the ID checker can confirm the identity of the candidate. The photograph and/or biometric information may be sent automatically, or only if requested by the ID checker.

Figure 3F:
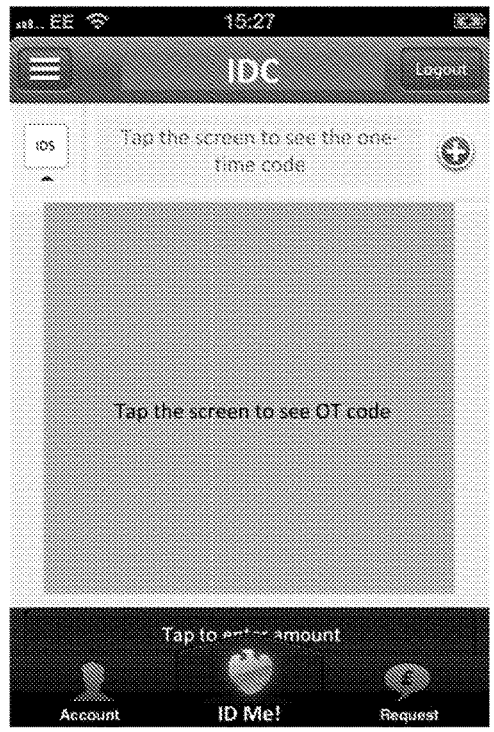
Figure 4D:
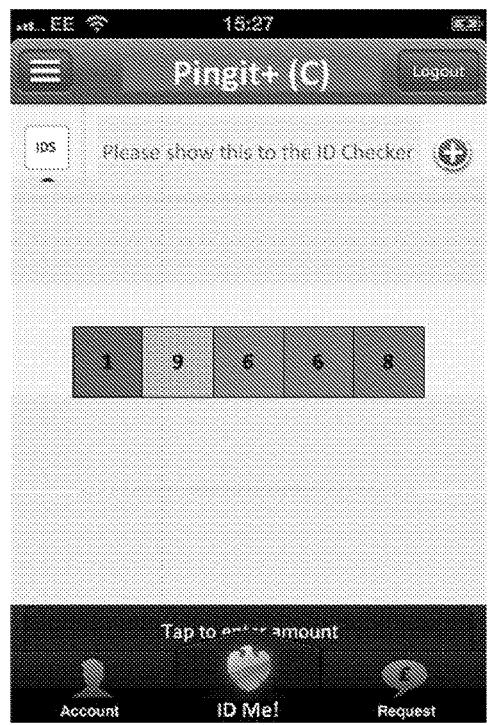

Either party may wish to check that the verification process that has just taken place is genuine, and is therefore given the option of requesting a validation code, such as a one-time (OT) code, as shown in FIGS. 3f and 4d. If the screen of either of the mobile devices 1, 8 is tapped, a request is sent from the respective mobile device 1, 8 to the mobile gateway 4, at step S10d. In response to the request, the mobile gateway 4 generates the validation code at step S10e, and at step S10f sends the same validation code for display by both the ID candidate application 1a and the ID checker application 8a. Alternatively, the validation code may be provided at an earlier stage, for example when providing the requested candidate information, without the need for a separate request.

Figure 3G:
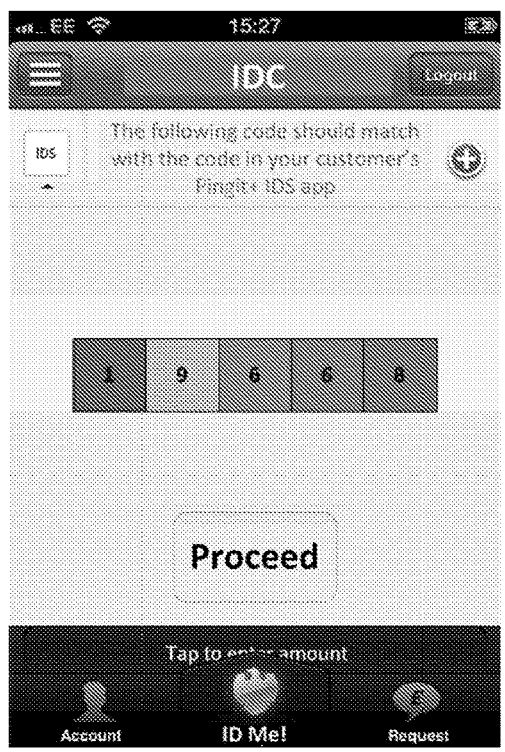
Figure 3G:
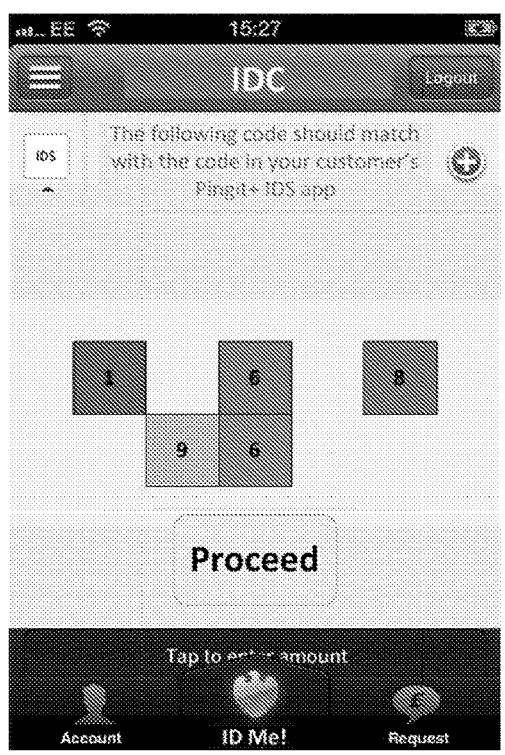
Figure 3H:
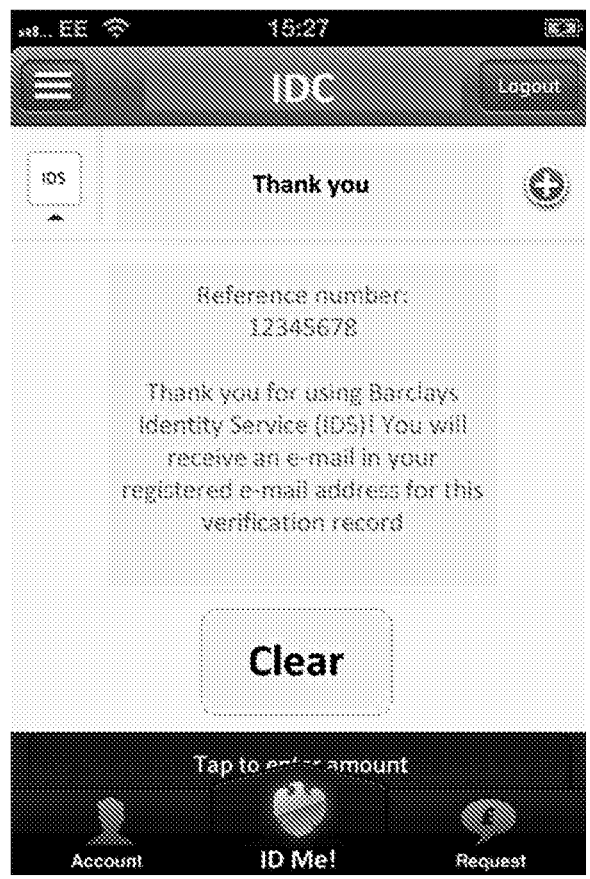

The validation code may be displayed as a code and/or as graphical image, as shown in FIGS. 4d and 3g respectively. In this case, the graphical image comprises a line of differently coloured blocks, which can be easily compared visually between the two displays. Alternatively, as shown in FIGS. 4di and 3gi respectively, the coloured blocks may be displayed in a multi-dimensional configuration, such as a 3D and/or time-variant configuration. The individual blocks could be squares, circles or triangles, but preferably not a mixture of these, to avoid over-complexity. To assist colour-blind users, a code in the form of a numerical or alphanumeric text string may be displayed either inside the boxes, or outside the boxes, or optionally when a corresponding button is clicked. Alternatively or additionally, the validation code may be output as an audio (e.g. musical) and/or sensory (e.g. vibration) signal, for example to assist visually impaired users.

The ID candidate application 1a and the ID checker application 8a may give the option for the ID candidate and the ID checker respectively to repeatedly request a new validation code, which is displayed on both mobile devices 1, 8. Additionally or alternatively, the validation code may comprise an image randomly selected from a set of images accessed by the mobile gateway 4, as shown for example in FIGS. 4dii and 3gii respectively. At least some of the set of images may have been previously selected or provided by the ID candidate or the ID checker, so as to personalise the service. Further images may be requested and displayed on both mobile devices 1, 8, as illustrated for example in FIGS. 4diii and 3giii.

Figure 4E:
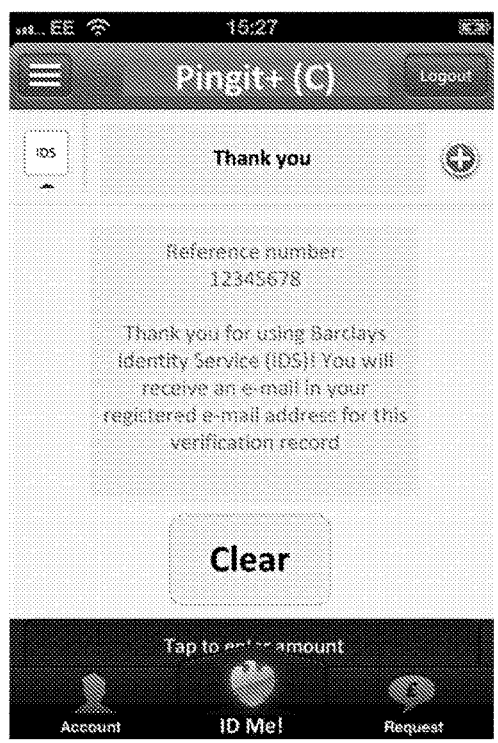

The ID checker compares the displayed validation codes and if satisfied that they match, may accept the candidate information as valid. Optionally, the ID checker may confirm the match in the ID checker application 8a, which then sends a confirmation message to the mobile gateway 4, at step S10g. At step S11, in response to the confirmation message, the mobile gateway 4 sends an acknowledgement message to the ID candidate application 1a and/or the ID checker application 8a, which may be displayed as shown for example in FIG. 3h, 4e. The acknowledgement message may comprise an email, SMS or other message addressed using the registered contact details of the respective parties. The acknowledgement message may be used to confirm that the candidate information was accepted by the ID checker, and may contain a reference code that can be used for audit purposes. The acknowledgement message may also be sent even if the ID checker does not confirm the match, but may record the fact that no match was confirmed.

Second Embodiment

A second embodiment of the invention will now be described, as a variant of the first embodiment. Similar steps to those of the first embodiment use the same reference numerals, and their description is not repeated. Likewise, similar screenshots to those in the first embodiment are not repeated.

In the second embodiment, the ID checker is required to register the ID checker application 8a and the identity of the ID checker is verified by the verification service before the ID checker application can be used. The method of the second embodiment is therefore more secure than that of the first embodiment, and some security measures may therefore be omitted. Instead of sending the candidate information to the ID candidate, the ID candidate is asked to approve the specific candidate information requested by the ID checker, before this candidate information is sent to the ID checker. The display of matching validation code codes is also not required in the second embodiment.

Figure 5:
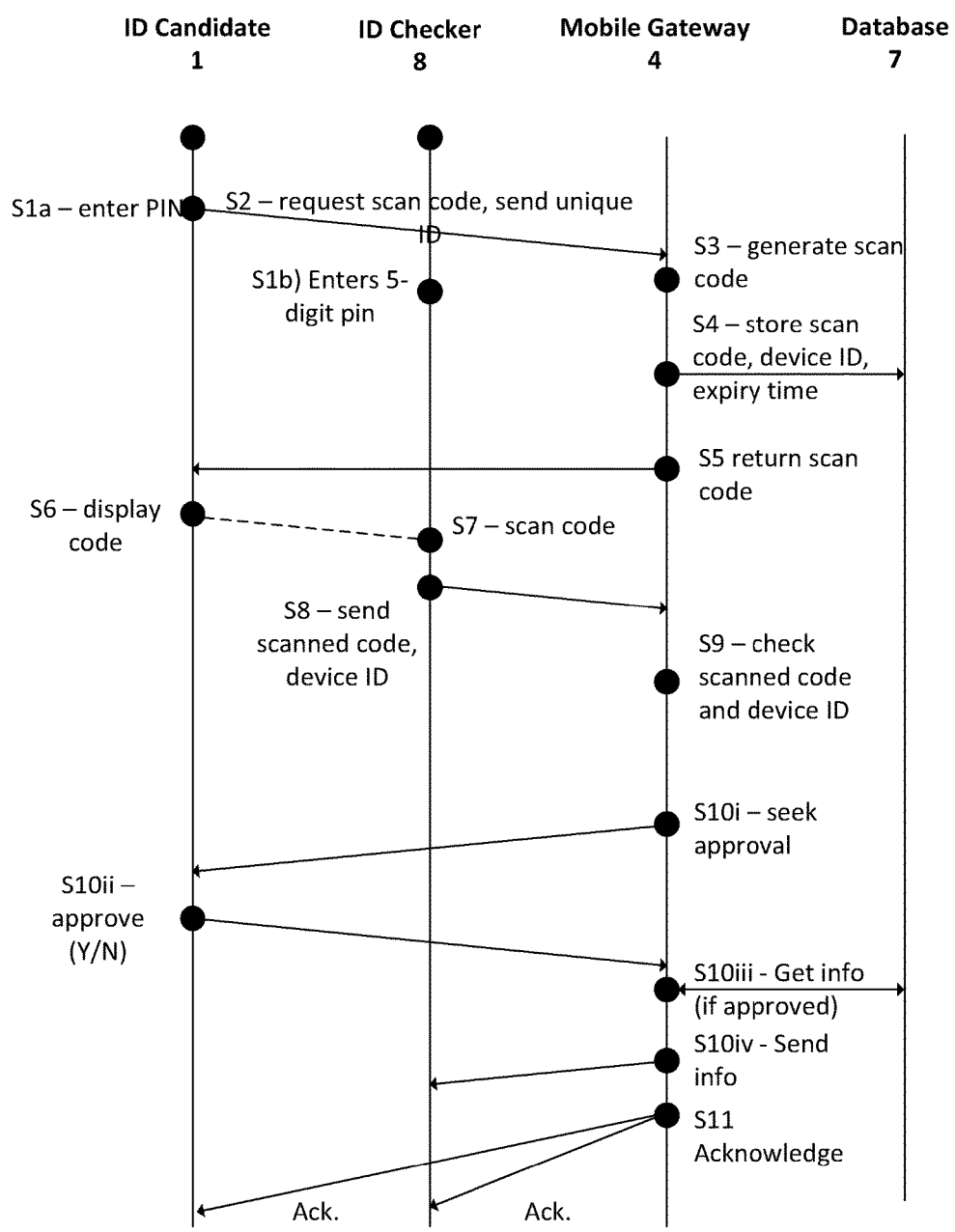
FIG. 5 is a diagram of an ID verification method in a second embodiment of the invention.

The verification process of the second embodiment, as shown in FIG. 5, proceeds in a similar way to that of the first embodiment up to step S9, except that the ID checker is required to log in to the ID checker application, for example as shown at step 1b before scanning the challenge code at step S7, and before specifying what candidate information is requested. As in the first embodiment, the specification may be configured during or after registration of ID checker application. Configuration of the specification may be locked, for example using a master passcode, to prevent misuse by unauthorised personnel. The specification may be cached to ease future re-use.

Figure 6:
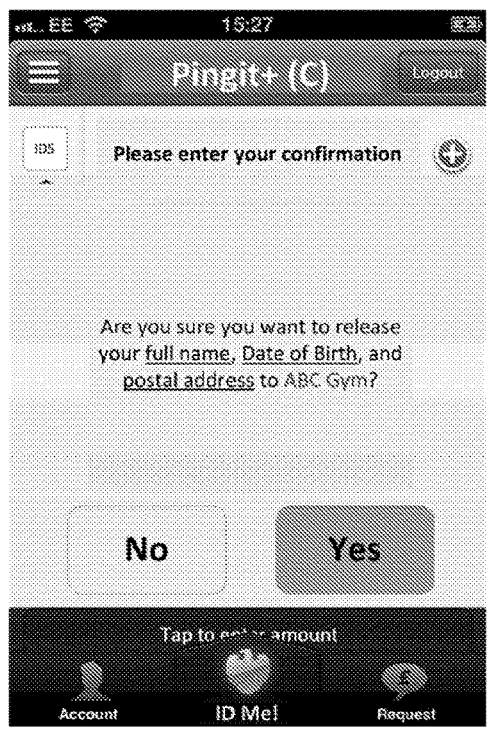
FIG. 6 is a screenshot of an approval request on the mobile device of an ID candidate in the second embodiment.

At step S10i of the second embodiment, the mobile gateway 4 sends a message to the ID candidate application 1a, indicating what information has been requested and seeking approval from the ID candidate. For example, as shown in FIG. 6, the message indicates that the full name, date of birth, and postal address of the ID candidate have been requested, together with the registered name of the ID checker ('ABC Gym' in this case). The ID candidate may select 'Yes' or 'No' to approve or disapprove this request, and a message indicating approval or disapproval is sent to the mobile gateway 4 at step S10ii. Where multiple items of information are requested, the candidate may individually approve or disapprove each item.

Figure 7:
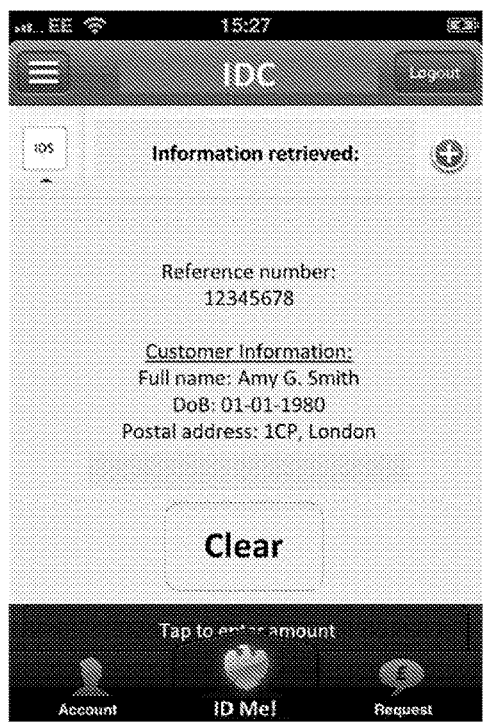
FIG. 7 is a screenshot of a candidate information display on the mobile device of an ID checker in the second embodiment.

If disapproved altogether, the ID verification process is terminated and a message indicating disapproval may be sent by the mobile gateway 4 to the ID checker application 8a. If approved, the mobile gateway 4 obtains the requested and approved candidate information from the database 7 at step S10iii, and at step S10iv sends the requested information to the ID checker application 8a for display, as shown for example in FIG. 7. The information may include a reference code.

At step S11, the mobile gateway 4 sends acknowledgement messages to the ID checker application 8a and the ID candidate application 1a. These may be similar to the acknowledgement messages sent in step S11 in the first embodiment, and may include the reference code, for audit purposes.

In this embodiment, the requested information may be sent to the ID checker in an electronic format, either at step S10iv or S11. For example, verified Candidate information for one or more ID candidates may be sent to the ID checker for importing into a database.

Alternative Embodiments and Applications

In the above embodiments, a photograph or other biometric data of the ID candidate and/or the ID checker may be retrieved and provided as part of the verification process. Where biometric data of the ID candidate is provided, it may not be necessary to require the ID candidate to be authenticated with the mobile device 1, as the biometric data allows the identity of the ID candidate to be verified.

The challenge code may be passed from the ID candidate device 1 to the ID checker device 8 by means other than displaying and scanning a machine-readable code. For example, a short-range point-to-point wireless or radio-based communication technology such as Bluetooth, Near-Field Communication (NFC), UltraWideBand (UWB), WiFi Direct, or any P2P wireless and radio technologies that can have their transmission power lowered (such as 3G, 3.5G, 4G, WiFi, WiMax) may be used. Transfer of the challenge code over a wireless connection may be initiated by 'bumping' the devices 1, 8 together, or by selecting an option within the candidate application 1a or the checker application 8a.

Instead of passing the challenge code from the ID candidate device 1 to the checker device 8, the challenge code may be requested by the checker device 8 and passed to the candidate device 1. The challenge code sets up a session between the candidate device 1 and the checker device 8, regardless of the direction in which the challenge code passes.

In some applications, such as law-enforcement, the ID Checker may be enabled to override the ID candidate restrictions for certain ID attributes. For example, in a variant of the second embodiment, disapproval of certain items at step S10*b* may be overridden at step 10*c*. In another variant, at step S10*b* the ID Candidate could select an option to provide deliberately incorrect data or to render the service inoperable, for example for a given time, if the ID candidate is under duress.

The verification service could be enhanced by providing a reputation score or rating as candidate information, and allowing the ID checker to add to the rating. For example, a tradesman (ID candidate) may assert that the last 20 business dealings were rated well by those customers (ID Checkers), with the verification service ensuring that the ratings come from registered ID checkers. Optionally, the verification service may provide to the current ID checker contact details of the previous ID checkers who provided a rating for the ID candidate and who gave permission for their contact details to be disclosed. [both parties could have reputation scores]

Instead of a dedicated ID checker or ID candidate application, a browser such as mobile web browser may be used. The candidate data may be sent to a mobile web page by sending a secure token with confirmed attributes to the web page, for example using Security Assertion Markup Language (SAML).

In a commerce environment, the verification service may be extended to allow the ID checker to provide details of goods or services to be paid for if the ID candidate meets the required identification criteria (e.g. over 18) and the ID candidate can elect to approve payment when approving the release of the ID data. The ID checker may be notified of payment made & optionally, delivery details provided by the verification service.

The above embodiments are described by way of example, and alternative embodiments which may become apparent to the skilled person on reading the above description may nevertheless fall within the scope of the claims.

Mobile Device Details

Figure 8:
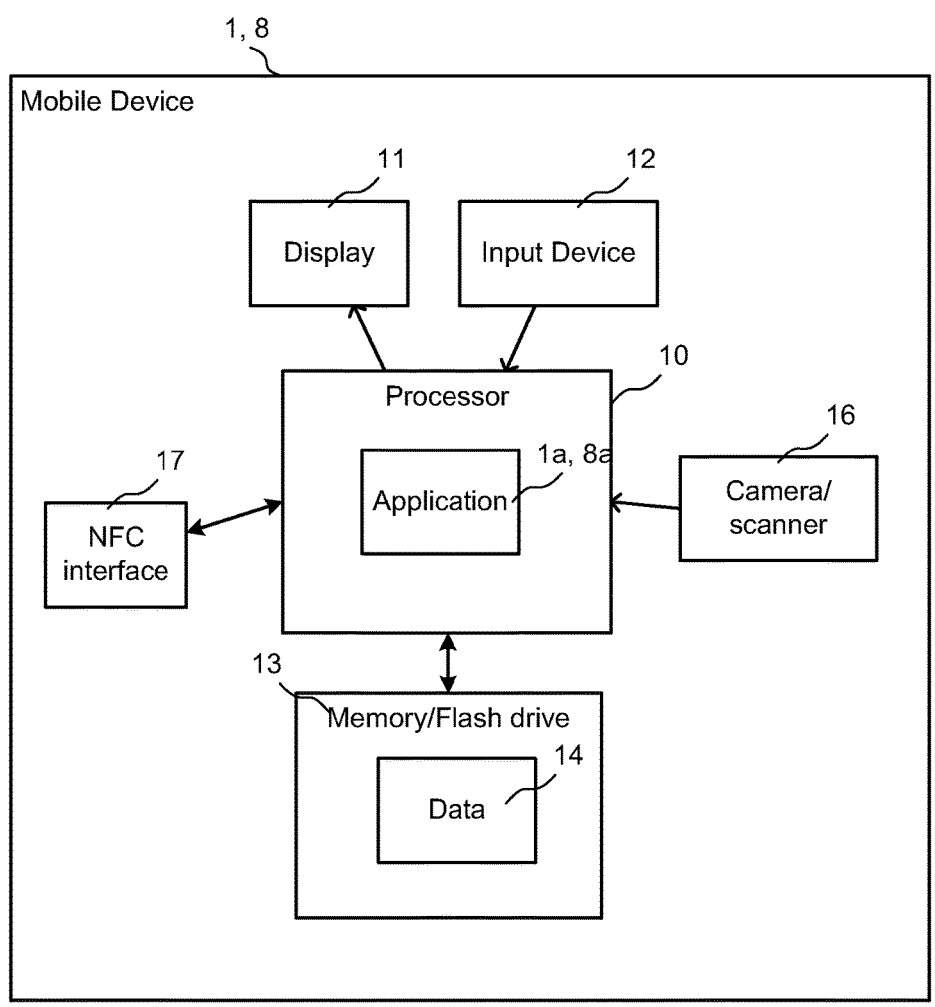
FIG. 8 is a diagram of a mobile device for use in embodiments of the invention.

FIG. 8 shows further details of one example of either of the mobile devices 1, 8 comprising at least a processor 10, including for example hardware and an application platform, running the application 1*a*, 8*a*, and connected to memory or other form of data storage facility such as flash drive 13 storing local data 14. The application platform may be a mobile operating system such as iOS™, Android™, Blackberry OS, Windows-based OS, or other embedded OS such as Open Embedded Build system, Symbian OS, Contiki, FreeBSD, and TinyOS. The application 1*a*, 8*a* may comprise program code, which can be loaded or downloaded onto the mobile device 1, 8.

The mobile device 1, 8 has a display 11 and a manual input device 12, which may be integrated with the display as a touchscreen, and/or provided as a keypad. An alternative or additional input device may be used, such as a trackball, trackpad, motion sensor or mouse. The mobile device 1, 8 may include or be connected to a camera or scanner 16 for capturing optical images and/or codes. The mobile device 1, 8 may include or be connected to a printer (not shown) for printing the challenge code, the candidate information, an acknowledgement and/or a receipts The mobile device 1, 8 includes a network interface 15 to the network 3. The mobile device 1, 8 may also include an NFC interface 17.

Computer Details

Figure 9:
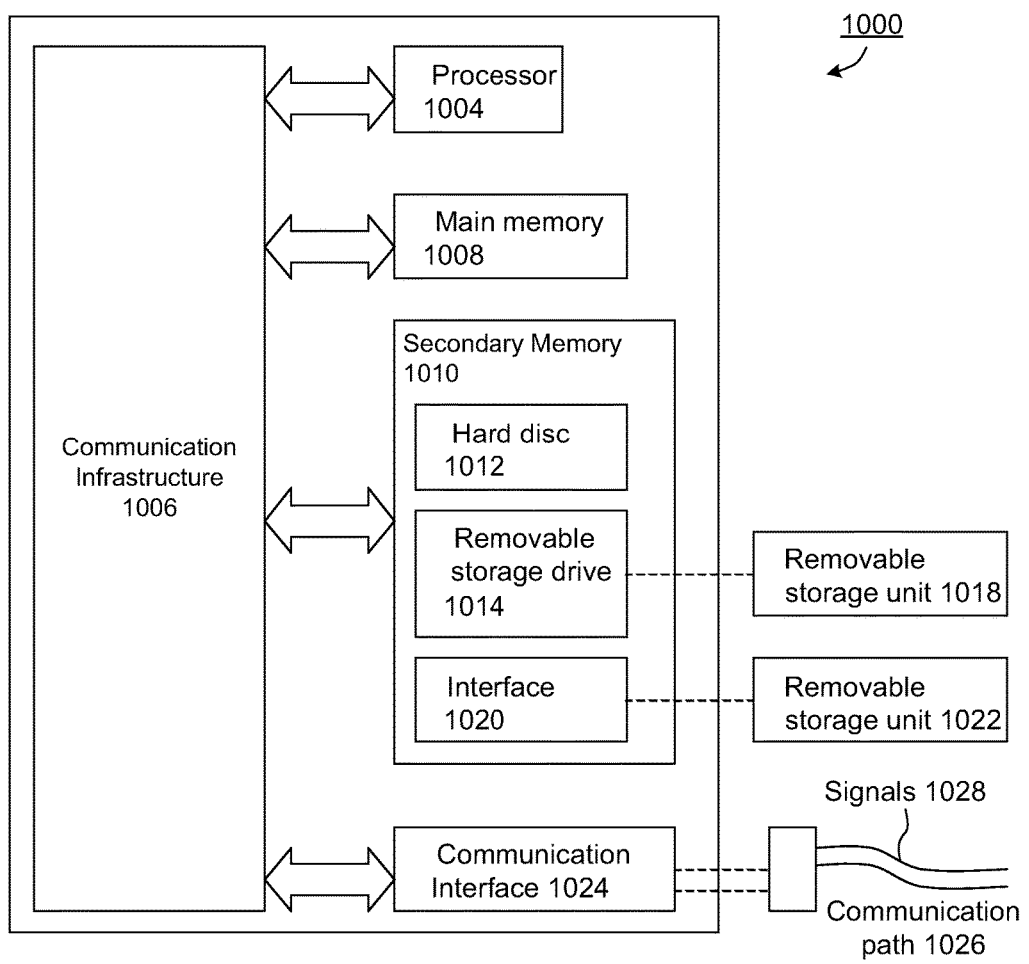
FIG. 9 is a diagram showing details of a computer system for use in embodiments of the invention.

The mobile gateway 4 may be implemented by computer systems such as computer system 1000 as shown in FIG. 9. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 618 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product and loaded into computer system 1000 using removable storage drive 1014, hard disk drive 1012, or communication interface 1024, to provide some examples.

Alternative embodiments may be implemented as control logic in hardware, firmware, or software or any combination thereof.

The invention claimed is:

1. A computer implemented method of providing candidate information associated with an identity (ID) candidate from a verification service to an ID checker, the ID candidate having a first communication device communicating over a computer network with the verification service and the ID checker having a second communication device different from the first communication device and communicating over the computer network with the verification service, the method comprising:
   a) obtaining a challenge code from the verification service at one of the first and second communication devices, wherein the verification service stores the challenge code with an identifier (ID) of the one of the first and second communication devices and validity information about the challenge code;
   b) passing the challenge code as a two-dimensional code from the one of the first and second communication devices that obtained the challenge code to the other of the first and second communication devices;
   c) verifying the passed challenge code with the verification service and, if the challenge code is verified, receiving a validation code from the verification service at both the first and second communication devices, the validation code comprises one of a graphical image, one-time code and a predefined set of codes;
   d) providing information about the ID candidate from the verification service to the second communication device, such that the information about the ID candidate is accessible to the ID checker under the control of the ID candidate;
   wherein the step of providing information about the ID candidate comprises:
      i) the verification service sending an approval request to the first communication device, wherein the approval request indicates a plurality of requested items regarding the information about the ID candidate;
      ii) presenting the plurality of requested items regarding the information about the ID candidate on the first communication device to the ID candidate;
      iii) receiving a selection of a subset of the plurality of requested items regarding the information about the ID candidate from the ID candidate on the first communication device;
      iv) sending by the verification service, only the selected subset of the plurality of requested items regarding the information about the ID candidate to the second communication device;
      e) displaying the validation code at both the first and second devices to compare the validation code provided by the first communication device to the validation code at the second communication device, and to validate the selected subset of the plurality of requested items regarding the information about the ID candidate sent by the verification service; and
      f) transmitting, by the verification service, an acknowledgement message indicating the selected subset of the plurality of requested items regarding the information about the ID candidate has been accepted by the second communication device.

2. The method of claim 1, wherein the challenge code does not contain identity information pertaining to the ID candidate.

3. The method of claim 1, further including specifying, on the second communication device, information about the ID candidate required.

4. The method of claim 3, wherein the plurality of requested items regarding the information about the ID candidate includes a confirmation that a specified criterion is met.

5. The method of claim 1, wherein the acknowledgement message includes the information about the ID candidate provided.

6. The method of claim 1, wherein the validation code is provided in response to a first validation code request from one or both of the first and second communication devices.

7. The method of claim 6, wherein a further validation code is provided in response to a second validation code request from one or both of the first and second communication devices.

8. The method of claim 1, wherein the validation code is output by both the first and second communication devices.

9. The method of claim 1, wherein the ID candidate is authenticated with the first communication device.

10. The method of claim 1, wherein the ID checker is authenticated with the second communication device.

11. The method of claim 1, wherein the first communication device is a mobile communication device.

12. The method of claim 1, wherein the second communication device is a mobile communication device.

13. The method of claim 1, wherein the challenge code is displayed as a code and is passed by scanning.

14. The method of claim 13, wherein the challenge code is displayed as a machine readable code.

15. A system for providing information about an identity (ID) candidate, the system comprising:
   a first communication device associated with the ID candidate;
   a second communication device, different from the first communication device, associated with an ID checker;
   a verification service communicating over a computer network with the first communication device and the second communication device; and
   a database accessible to the verification service;
   wherein the system is further arranged to:
   a) obtain a challenge code from the verification service at one of the first and second communication devices, wherein the verification service stores the challenge code with an identifier (ID) of the one of the first and second communication devices and validity information about the challenge code;
   b) pass the challenge code as a two-dimensional code from the one of the first and second communication devices that obtained the challenge code to the other of the first and second communication devices;

c) verify the passed challenge code with the verification service and, if the challenge code is verified, receive a validation code from the verification service at both the first and second communication devices, the validation code comprises one of a graphical image, one-time code and a predefined set of codes;

d) provide information about the ID candidate from the verification service to the second communication device, such that the information about the ID candidate is accessible to the ID checker under the control of the ID candidate, wherein the provide information about the ID candidate cause the system to:
  i) send an approval request by the verification service to the first communication device, wherein the approval request indicates a plurality of requested items regarding the information about the ID candidate;
  ii) present the plurality of requested items regarding the information about the ID candidate on the first communication device to the ID candidate;
  iii) receive a selection of a subset of the plurality of requested items regarding the information about the ID candidate from the ID candidate on the first communication device;
  iv) send by the verification service, only the selected subset of the plurality of requested items regarding the information about the ID candidate to the second communication device;

e) display the validation code at both the first and second devices to compare the validation code provided by the first communication device to the validation code at the second communication device, and to validate the selected subset of the plurality of requested items regarding the information about the ID candidate sent by the verification service; and f) transmit, by the verification service, an acknowledgement message indicating the selected subset of the plurality of requested items regarding the information about the ID candidate has been accepted by the second communication device.

16. A non-transitory computer readable medium having computer-executable instructions stored thereupon which when executed by one or more processors, cause the one or more processors to provide candidate information associated with an identity (ID) candidate from a verification service to an ID checker, the ID candidate having a first communication device communicating over a computer network with the verification service and the ID checker having a second communication device different from the first communication device and communicating over the computer network with the verification service, the computer-executable instructions further comprise instructions to:

a) obtain a challenge code from the verification service at one of the first and second communication devices, wherein the verification service stores the challenge code with an identifier (ID) of the one of the first and second communication devices and validity information about the challenge code;

b) pass the challenge code as a two-dimensional code from the one of the first and second communication devices that obtained the challenge code to the other of the first and second communication devices;

c) verify the passed challenge code with the verification service and, if the challenge code is verified, receive a validation code from the verification service at both the first and second communication devices, the validation code comprises one of a graphical image, one-time code and a predefined set of codes;

d) provide information about the ID candidate from the verification service to the second communication device, such that the information about the ID candidate is accessible to the ID checker under the control of the ID candidate, wherein the provide information about the ID candidate cause the system to:
  i) send an approval request by the verification service to the first communication device, wherein the approval request indicates a plurality of requested items regarding the information about the ID candidate;
  ii) present the plurality of requested items regarding the information about the ID candidate on the first communication device to the ID candidate;
  iii) receive a selection of a subset of the plurality of requested items regarding the information about the ID candidate from the ID candidate on the first communication device;
  iv) send by the verification service, only the selected subset of the plurality of requested items regarding the information about the ID candidate to the second communication device;

e) display the validation code at both the first and second devices to compare the validation code provided by the first communication device to the validation code at the second communication device, and to validate the selected subset of the plurality of requested items regarding the information about the ID candidate sent by the verification service; and f) transmit, by the verification service, an acknowledgement message indicating the selected subset of the plurality of requested items regarding the information about the ID candidate has been accepted by the second communication device.

* * * * *